United States Patent [19]

Walsh

[11] 4,425,381

[45] Jan. 10, 1984

[54] BULK CARGO HANDLING METHOD

[76] Inventor: Myles A. Walsh, 143 North Main St., Cranbury, N.J. 08512

[21] Appl. No.: 338,844

[22] Filed: Jan. 12, 1982

[51] Int. Cl.³ .................. B05D 7/22; B05D 5/08; B05D 1/36; B05D 1/12
[52] U.S. Cl. .................... 427/181; 427/212; 427/221; 427/230; 427/239
[58] Field of Search .......... 427/181, 221, 212, 230, 427/239

[56] References Cited

U.S. PATENT DOCUMENTS

| | | | |
|---|---|---|---|
| 4,287,236 | 9/1981 | Kestner et al. | 427/221 |
| 4,312,901 | 1/1982 | Kekish et al. | 427/239 X |
| 4,338,359 | 7/1982 | Kestner | 427/230 |
| 4,342,797 | 8/1982 | Kober et al. | 427/212 X |

Primary Examiner—James R. Hoffman
Attorney, Agent, or Firm—Kenway & Jenney

[57] ABSTRACT

A method is disclosed which facilitates the handling of bulk cargos of minerals (particularly coal) agricultural and forest products and their unloading from a storage or shipping container. In accordance with the disclosed method the bulk material is coated with a release agent in a peripheral zone surrounding its mass in areas adjacent the interior wall surfaces of the container. To form such a zone of bulk material coated with release agent, that area of the bulk material is continuously sprayed or dusted with a release agent during loading. Preferably, the interior surfaces of the container are likewise coated with a release agent, either prior to loading or simultaneous with the coating of the bulk material during loading.

24 Claims, 4 Drawing Figures

MOVEMENT OF CONTAINER WHILE CARGO IS LOADED FROM STATIONERY CONVEYOR HEAD 14

BULK CARGO HANDLING METHOD

BACKGROUND OF THE INVENTION

1. Field of the Invention

This invention relates to a method for improving the discharge of bulk cargos of minerals, agricultural and forestry products from railroad cars, trucks, conveyors and silos. More particularly, it relates to a method to facilitate the unloading of cohesive, sticky or frozen bulk cargos of commodities such as coal, corn, wood chips and the like, and to improvements in the unloading of bulk cargos from their shipping containers.

2. Prior Art

As an example of bulk handling and shipping of materials, it is now commonplace to ship by rail, cargos of minerals such as coal in lots of 10,000 tons using 100 to 120 railroad cars coupled together as a unit train that repeatedly travels between mine and destination at frequent intervals. For efficiency of material handling and to maximize the repeated and continuous use of transportation equipment, a unit train cargo of 10,000 tons of coal often unloads at destination while moving slowly over the cargo dump site. Systems have been perfected and installed for the rapid unloading of cargos in bulk; these, however, require that the cargo flow freely on command as each railroad car or truck passes over the system's cargo discharge site.

Two major systems are used for unloading bulk cargos from railroad cars. One system inverts the car (sometimes several cars simultaneously usually without uncoupling) by rotating it about 160°; this system can handle nearly all types of open-top cars. The other system uses cars having bottom or hopper doors that are opened mechanically or automatically as the train passes over the dump site. Both systems of unloading frequently fail to entirely discharge the contents of each car due principally to the sticky characteristics of small particles contained in bulk cargos, friction and cohesion of these particles with container surfaces, and freezing of some cargos in severe winter weather.

Bulk cargos are frequently stored before and after transit in silos where they arch against the silo walls and fail to flow readily from chutes at the base of silos, unless mechanically assisted.

The adhesion of cargo particles to the wall surfaces and to the bottoms of their containers slows and frequently prevents their complete discharge during unloading. As a result each railroad car of a unit train of coal, for example, often does not discharge at destination its total cargo, but instead returns to the mine with significant amounts (up to 20 tons) of coal in freezing weather, some of which may become lost along the way due to jolting, air currents and the sluicing action of rain. This is a wasteful practice that can be harmful to the environment. Such residues of cargo clinging to the surfaces of containers, if not lost en route, become a contaminant in the bottom of a railroad car, truck or conveyor when next loaded.

Noisy electric and pneumatic vibrators are used frequently to shake railroad cars vigorously and vibrate chutes to dislodge cargos from their containers at dump sites, and to make bulk cargos dislodge from their containers, hoppers, chutes and silos. Air cannons are sometimes used for freeing material at large silos near their bottom ends where bulk material, such as coal, tends to adhere to the silo's walls to form an arch or blockage. Explosives are sometimes used to dislodge by vibration or to shoot a projectile into the hang-up of material above a chute or discharge point to bring down a blockage. This use of explosives can be hazardous.

Problems caused by bulk cargos that stick to the walls and bottoms of their containers and to the walls and chutes of silos, are compounded during severe winter weather when freezing conditions prevail. Moisture lodged between individual particles of cargo freezes, particularly where the particles contact the surfaces of their shipping containers, storage silos or chutes, to which they freeze. Under winter conditions it often becomes necessary to thaw each railroad car in a thawing shed before its contents of coal, for example, can be discharged at destination. Obviously this is a time consuming and costly procedure, consuming calorific energy.

Chemical means are sometimes used, especially with bulk cargos of coal, to prevent freezing during winter weather. In a sub-freezing environment, surface moisture freezes and bonds individual particles together and to the metallic surfaces of railroad cars and trucks and other container surfaces. Whenever the handling of bulk cargos containing surface moisture is confronted with sub-freezing conditions, it will freeze to its container walls, in railroad cars, trucks, silos, chutes, conveyor belt surfaces, etc. To retard this freezing, particularly with cargos of coal, freeze conditioning agents are used (usually glycol or oil). These are sprayed onto the stream of bulk material as it passes through a spray chamber or fog zone of freeze conditioning agent, usually while the bulk cargo is loaded into its container for transport in freezing weather. This method uses excessive amounts of the agent because the entire cargo is treated, including material that is loaded in the center of the container which is thus insulated from freezing and need not be freeze-proofed.

Oil base freeze-proofing agents lose their effectiveness when temperatures fall below 20° F. and they are, therefore, generally not satisfactory.

Calcium chloride based products are also used to defreeze after bulk cargos have frozen to the sides of their containers. They are unsatisfactory because they are corrosive to the metallic walls of containers.

Since container surfaces tend to slow the flow of materials in bulk at their points of discharge, the bottoms of chutes, silos, trucks and railroad cars are sometimes steeply inclined to encourage material discharge. Steep angles of surfaces or metallic slides at drawpoints at the bottom of railroad cars, for example, facilitate the discharge of coal cargos from the bottom of the car when its dump doors are mechanically opened automatically for rapid unloading of cargo. The use of relatively steeply inclined surfaces or slope plates (inclined up to 60°) at the floor of railroad cars to improve their unloading, however, sacrifices cargo capacity of the car. Part of the area of roof-like gable structures used as false bottoms to cover the floor of cars, silos and chutes at discharge points could advantageously be used for stowage of additional cargo. This loss of cargo carrying capacity can be significant in the case of railroad cars designed to carry bulk commodities such as coal or grain because the unit train of many cars makes numerous repetitive journeys from mine to destination, and any loss of carrying capacity through inherent design is cumulative. Additionally, the metal sheets of the false bottoms and slope sheets add burdensome weight and construction expense to railroad rolling stock.

Safety is also a factor in the need for unrestrictive flow of bulk materials from their containers. The arching or hangup of substances in bulk at the time of discharge from a drawpoint, for example, at a silo, creates a temporary void at its base which can collapse without warning with an outrush of explosive dust for some bulk materials such as coal or grain. Avoidance of this potential disaster is currently sought by using steeply inclined bottom surfaces in some instances, but the present state of the art becomes inadequate when materials naturally adhere and arch over to the sides of their containers or silos.

SUMMARY OF THE INVENTION

The instant invention provides a unique and inexpensive method of facilitating the flow of bulk commodities from their shipping containers, hoppers, chutes, storage silos and the like, and enables greater and more efficient use of existing facilities for handling, stowing and transporting bulk products of mining, agriculture and forestry, even during freezing conditions. The method facilitates the release and free flow of bulk materials by lowering the coefficient of friction of the surfaces, i.e. walls and floor, of their containers, chutes and drawpoints through the repeated application on said surfaces of a suitable release agent, preferably a fluorinated hydrocarbon, optionally in combination with an antifreeze agent.

Thus, the present invention provides a method for facilitating the discharge of bulk materials such as minerals (particularly coal), agricultural and forest products from a storage or shipping container. A peripheral zone of the bulk material, adjacent an interior surface of the container, is provided with a coating of a suitable release agent. That zone of coated bulk material is conveniently formed by continuously spraying or dusting the peripheral areas of the bulk material is being loaded. Preferably, prior to loading the bulk material or simultaneous with the coating of the bulk material in the peripheral zone during loading, the interior surfaces of the container are also coated with a release agent. The release agent used to coat the container surfaces may be the same as that used to coat the bulk material in the peripheral zone.

Preferably, while a railroad car, truck, conveyor belt, chute, slope plate or equivalent conveyance or silo is in process of being loaded with bulk material, or about to be loaded, its surfaces that contact the cargo are also coated with an ultrathin film of a release agent, e.g. a non-stick, low friction fluorinated hydrocarbon. This coating reduces significantly the coefficient of friction at the surfaces which would otherwise impede the flow of bulk materials (bulk minerals such as ores and coal, agricultural products such as grains and certain forestry products as wood chips), when these materials are dumped from the containers.

Where surfaces are continuously burdened by bulk materials, such as the walls and slope plates of chutes, hoppers, and the bottom ends of silos, and the like, such surfaces may be repeatedly coated with the release agent by built-in piping equipped with spray nozzles and/or drizzle outlets appropriately located to coat wall surfaces and slope plates at or near the principal bulk material withdrawal points. As rapidly as the thin film of the release agent which creates non-stick conditions is worn away at those surfaces which are continuously burdened, the wear surface areas are recoated with the release agent through internal piping, spray nozzles and drizzle outlets.

The sides and bottoms of railroad cars, trucks and equivalent conveyances of bulk cargos may be coated with a film of release agent by spraying or dusting just prior to their loading with bulk cargo. The spraying-/dusting process is repeated each time a railroad car, truck or equivalent is loaded to maintain non-stick surfaces to container walls and at the bottom of the container. Alternatively, the interior surfaces of the container are coated simultaneously with the spraying-/dusting of the bulk material in the peripheral zone.

Accordingly, it is an object of the present invention to provide a method which significantly improves and facilitates the discharge of bulk materials from their containers so that dumping or unloading is complete and expeditious, and without time consuming auxillary mechanical assistance.

Another object of the invention is to prevent arching or bridging of bulk materials in their storage silos above their withdrawal points or chutes, thus avoiding blockage at the exit and an associated large cavity or void at the base of the silo, the sudden and unpredictable collapse of which can create electrostatically charged bursts of dust which can be explosive and hazardous to workers, their equipment and the surroundings.

Another object of the invention is to minimize the transit time of unit-train equipment, locomotives, railroad cars, trucks, conveyor belts and similar conveyances. The efficient use of such equipment requires that bulk materials be unloaded expeditiously and completely at cargo destinations without unloading delays caused by bulk materials adhering to the surfaces of their containers at unloading sites.

Still another object of the invention is to eliminate the wasteful practice of incomplete discharge of bulk cargos at unloading sites, so that no undumped portion of the cargo is carried back to contaminate the next load of the conveyance.

Another object of the invention is to provide an inexpensive means for preventing bulk cargos of minerals, agricultural and forestry products from freezing to the walls of their containers during sub-freezing weather.

Another object of the invention is to provide a substitute for mechanical methods presently used for container unloading that vigorously shake and break containers, replacing such state of the art with less harmful chemical methods for cargo release.

Still another object of the invention is to allow the design of containers without false bottoms consisting of steeply inclined slopes for their unloading which consume space and add superfluous weight and corresponding construction (fabrication) expense.

These and other objects and features and further scope of applicability of the present invention will become apparent from the detailed description to follow, taken in conjunction with the accompanying drawings.

DESCRIPTION OF THE PREFERRED EMBODIMENT

Figure 1:
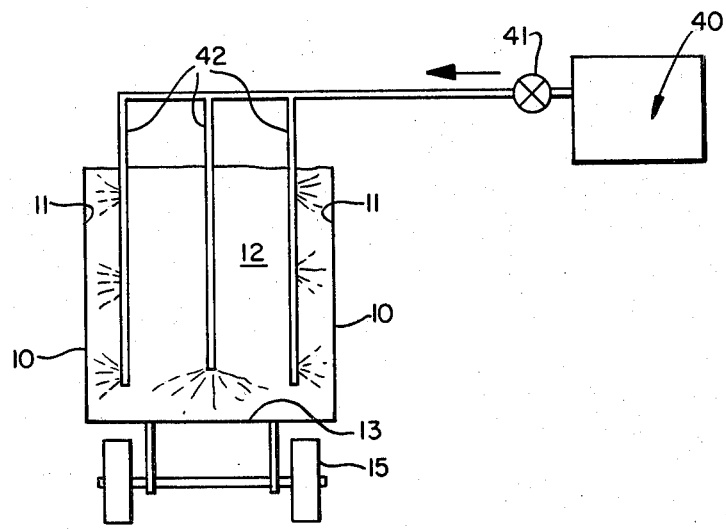
FIG. 1 is a schematic vertical front cross-section of an empty bulk cargo shipping container, such as the body of an open-top railroad gondola car, whose inner surfaces (walls, ends and bottom) are in the process of being sprayed with a release agent in accordance with the present invention.

The invention in its broadest aspects is concerned with the ready flow and prompt release of bulk cargos from their containers through the use of release agents to create anti-stick and/or anti-freeze conditions at container inner surfaces to facilitate bulk cargo unloading. The inside surfaces of containers, and particles (grain, granules, lumps or powders) of bulk cargo in the immediate vicinity of the container walls, are systematically coated to significantly lower their coefficient of friction, preferably by the introduction of dispersions or particles of waxy short-chain telomers, preferably that of tetrafluoroethylene, as a dust or in a dispersing solvent such as trichlorotrifluoroethane, trichloroethane or methylene chloride. Heptane, perchloroethylene, trichloroethylene, toluene, benzene, naphtha, methanol, ethanol, isopropanol, acetone, dioxane, glycol, water, trichloroethane, methylene chloride and mixtures thereof may also be used as solvents or solvent extenders. In winter weather, freeze conditioning agents such as glycols may be employed as the release agent, alone or in combination with one of the aforementioned release agents. The zone of bulk material treated in accordance with the present invention is confined to areas or regions where bulk material makes contact with the confining surfaces of the container. Accordingly, the method of the present invention uses a surprising small quantity of freeze conditioning agent and/or other release agent in relation to the mass of the bulk cargo, since its massive interior remains untreated.

A primary object of the invention is to increase the speed and thoroughness, as compared with prior art techniques, with which bulk cargos are unloaded from their containers, particularly by the application of release and freeze conditioning agents to the interior surface of shipping containers and to the particles of bulk cargo that make contact with those surfaces. This is preferably accomplished by coating and/or dusting the inside walls and bottom of the container with a waxy short-chain telomer or equivalent to create conditions of high lubricity and anti-stick conditions at the container interior surfaces. To additionally provide lubricity and freeze-proofing, particles of the bulk cargo located in a zone zero to twenty inches from the container surfaces are sprayed or dusted continuously during the process of cargo loading. The depth of this treatment of cargo particles depends upon the nature of the cargo, its natural tendency to hang-up during dumping from containers (railroad cars, trucks, etc.), container design, facility and equipment used for cargo unloading, cargo wetness or humidity, and whether freezing conditions are likely during transit or at the cargo unloading site. The present invention expedites the unloading of bulk cargos from their containers by introducing release and anti-freeze agents so that the perimeter of the bulk cargo at its contact with its container is lubricated for dumping at cargo destination. In the preferred embodiment, the interior surfaces of the container are coated with the same release agent simultaneous with the coating of the bulk material in the peripheral zone.

A secondary, but important, objective of the invention is to increase the rate at which bulk cargos can be loaded into their containers from silos, chutes and conveyors, thereby utilizing containers more fully without delays for loading, and also making better use of the locomotives and trucks that standby during the loading sequence, sometimes for lengthy periods (or they go away to return another day, causing lost time and deadhead trips wasting valuable fuel). The invention provides for lowering the coefficient of friction of silo walls, bins, chutes, belt conveyors, etc., to create antifriction and anti-freeze conditions to expedite the flow of bulk materials at the sites where they are loaded into containers for shipment. Short-chain telomers in combination with glycols are introduced through pipes or tubes onto the interior walls of silos, bins and chutes to coat those surface areas where bulk materials make contact. Surfaces that were previously friction areas are thus lubricated and protected from freezing and blockage, preventing hang-ups and bridging of material.

The prevention of bridging by chemical means within a silo likewise prevents the formation of a large void followed by bulk material collapsing en masse into the void—a dangerous situation that, under present conditions at silos, can be followed by a dust explosion within the silo and surroundings, resulting in injury to equipment and personnel.

Application of the invention may be varied depending upon the type of bulk cargo handled and the characteristics of the equipment and container used for loading and hauling of the cargo. For example, if the cargo is a raw agricultural product destined for processing for consumption by animals or humans, the chemicals used must not be harmful to life unless processing will completely remove toxicity. Bulk cargos of minerals and those of forestry products, on the other hand, can utilize a wider range of release agents to facilitate their loading and unloading. Generally the application of the release agent commences just prior to the loading of a container with bulk cargo to coat the container interior, and continues while the container is in process of being loaded, to establish the peripheral zone of coated material.

FIG. 1 depicts a container 10 whose interior surfaces (walls 11, ends 12, and bottom 13) are in the process of being coated with a release agent such as a waxy short-chain telomer to provide the interior surfaces with a low coefficient of friction and anti-stick properties. The release agent is applied by being sprayed or dusted onto the container interior surfaces and is introduced from source 40 through valve 41 and pipelines 42. During spraying or dusting the container 10 may be held stationary and moveable pipes 42 used to cover the entire interior surface with the coating (including the container's ends 12, see FIG. 3); or a series of containers connected together, such as a unit train, can be coated as the train moves slowly under fixed position spray or dusting piping 42. For coating moving containers so their interior surfaces are made to have anti-stick properties, the flow of coating material is controlled by valve 41 and pipe assembly 42 and is mounted in a manner in which it may be flipped into and out of the containers that pass beneath.

The dusting or spraying of interior surfaces of the container of FIG. 1 is accomplished with conventional equipment adapted for the purpose of the present invention. Application of the coating is possible using compressed air sprays and dusting equipment, airless sprays, and in the case of containers insulated or mounted on rubber tires, electrostatic spraying is possible.

Figure 2:
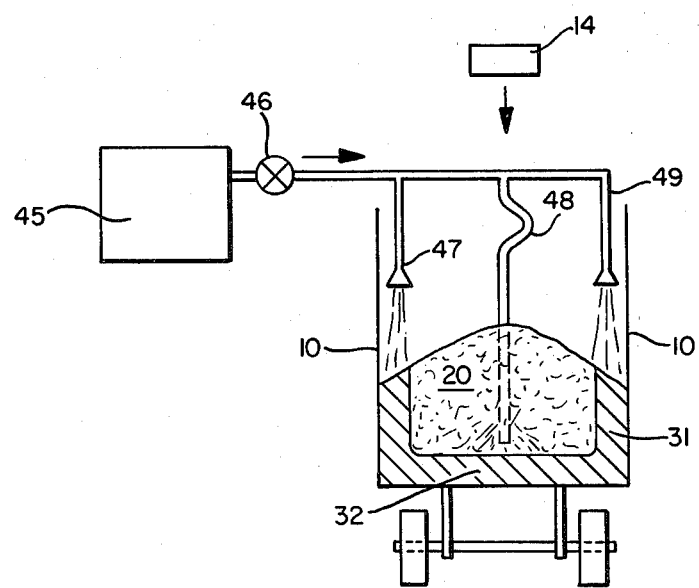
FIG. 2 is a schematic frontal view, in cross-section, of the loading of a bulk cargo shipping container, subsequent to the interior coating process illustrated by FIG. 1.
Figure 3:
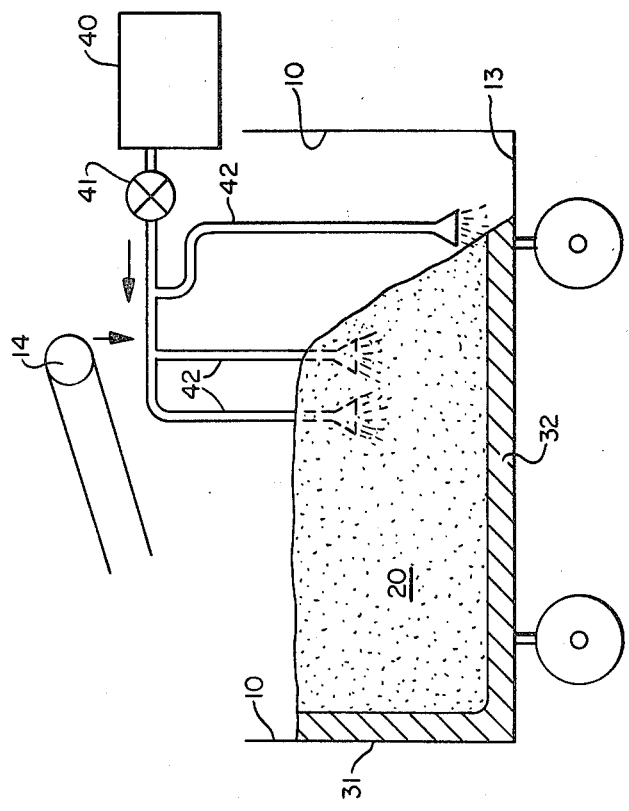
FIG. 3 is a schematic side view, in cross-section, of the loading operation depicted in FIG. 2; and, FIG. 4 is a vertical cross-section of a loaded silo, hopper, or bin provided with inlets for the introduction of a release agent in accordance with the present invention.

FIGS. 2 and 3 depict the loading of a bulk cargo 20 which is simultaneously sprayed in the area of zones 31 and 32 with a coating of telomer or material of like nature. The bulk material 20 is progressively loaded from the terminus of a conveyor or chute 14. As loading takes place, zones 31 and 32 of width of zero to twenty inches (depending on need), are sprayed or dusted with a freeze conditioning agent (in winter season only) and/or other release agent from source 45 through control valve 46 and pipes 47, 48 and 49. The spraying or dusting mechanism is designed to coat particles of the cargo as they fall in place in a peripheral zone including container side-wall zone 31 and floor zone 32. Standard equipment for spraying and dusting is used to coat the particles in this limited zone progressively as the container moves beneath the loading device 14. When loading of the moving container is completed, the pipes 47, 48 and 49 (and additional pipes or tubes if required) are withdrawn from the container and flipped into the container next to be loaded. The pipes or tubes, 47, 48 and 49 are flexible and capable of being elevated and lowered as needed during the container loading process; that movement and the flow of release agent is controlled externally via valve 46 and mechanically coordinated with the height of cargo or area of container wall surface or floor to be coated by spraying or dusting.

When the dusting or spraying of cargo particles in zones 31 and 32 of FIGS. 2 and 3 is optionally conducted with the same chemical as used for coating interior surfaces 11 of the container as depicted in FIG. 1, then the interior surfaces of the container and the zones 31 and 32 may be simultaneously coated using the same assembly of pipes 47, 48 and 49.

Figure 4:
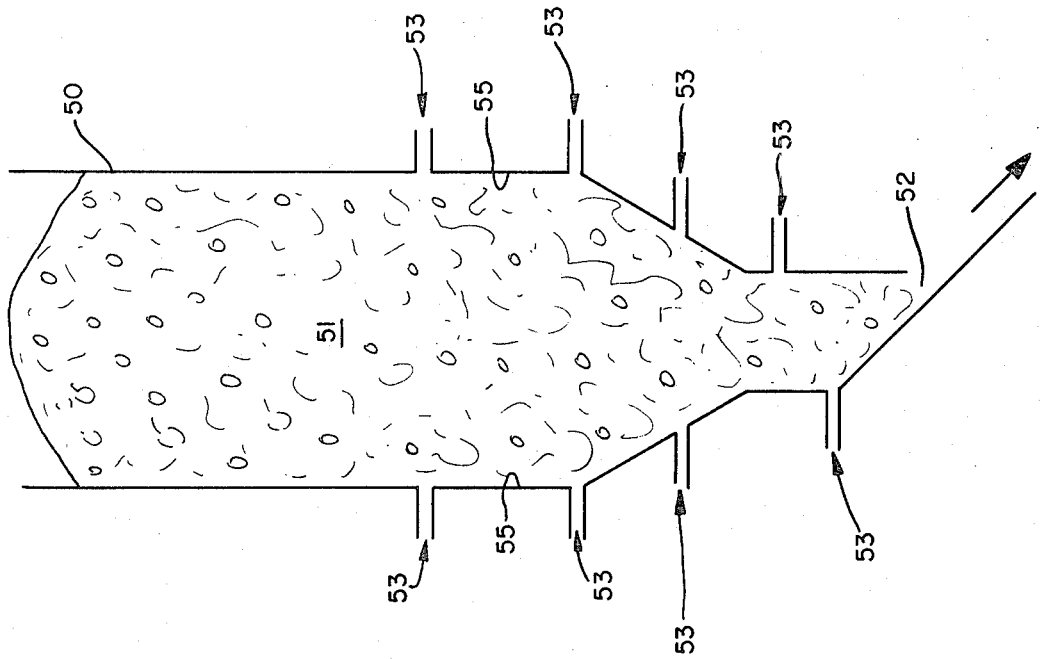

FIG. 4 illustrates a loaded silo or bin 50, filled from the terminus of conveyor 54 with bulk cargo 51 and equipped with exit chute 52 and a series of pipe connections 53 around the circumference of the silo or bin walls for the introduction, as needed, of a liquid or powder release agent for flow downwards to intermittently form a liquid or powdered curtain over the interior surface 55 which, upon drying, or dissemination, provides a non-stick coating and zone of high lubricity for the flow of material through exit chute 52. In the winter season the same pipes 53 serve as inlets for the introduction of freeze conditioning agents, to freeze-proof the material adjacent to the walls of the silo or bin where it is most vulnerable to freezing. Silos such as depicted in FIG. 4 are sometimes huge for the purpose of holding minerals, with capacities of over 10,000 tons for coal. The present invention provides piping connections to inlets 53 for the supply of release agent so that the constricted exit (bottom end) of the silo or chute will discharge its cargo continuously without hang-up or bridging of cargo.

In summary, the present invention provides the following advantages:

1. Improves efficiency of handling sticky bulk cargos and facilitates their flow from storage to loading shipping containers and discharge at destination. Cargo loading and unloading time is thereby decreased.

2. Provides a means to envelop bulk cargos with a blanket of chemically treated material that will not freeze during sub-freezing weather, thus preventing freezing of the mass at its center.

3. Prevents hangups of sticky bulk cargo along the sides and bottoms of shipping containers so that they discharge completely without leaving residues clinging to container walls and bottoms—residues that can be harmful environmentally and can contaminate the next cargo loaded into the container. Also facilitates the discharge (dumping) of cargos without time consuming mechanical assistance.

4. Decreases wear and tear on conveyors, chutes, containers and the like.

5. Eliminates mechanical means for vibrating and shaking containers as practiced by the state of the art for discharging bulk cargos, a process that is both noisey and time consuming, and hard on equipment and thereby extends the life of equipment.

6. Makes possible the design of containers to hold greater cargos in a given space.

7. Increases the speed and reliability of bulk cargo unloading at destination.

8. Makes the handling of dusty cargos safer and less hazardous; protects against violent dust explosions at silos and similar large containers.

9. Provides a continuing process for maintaining non-stick surfaces at wear areas during the handling of bulk materials.

10. Prevents materials from sticking to conveyors and thus improves conveyor utility.

11. Makes possible the simplified design and construction of containers with related economic benefits.

The invention may be embodied in other specific forms without departing from the spirit or essential characteristics thereof. The present embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

I claim:

1. A method for facilitating the discharge of bulk cargos of minerals, agricultural and forestry products, from a storage or shipping container by reducing the coefficient of friction of surfaces of the container, said method comprising:
coating, with a first release agent, only the area of the bulk material around its periphery, adjacent the inner walls of the container, continuously as the bulk material is loaded, to create a peripheral zone of coated bulk material surrounding a larger central zone of uncoated material.

2. The method of claim 1 additionally comprising coating the interior surfaces of the container with a second release agent.

3. The method of claim 1 or 2 wherein said first release agent includes a freeze preventative agent to form a freeze-proof blanket in said peripheral zone.

4. The method of claim 3 wherein said freeze-preventative agent is selected from the group consisting of glycols, oils, calcium chloride and solutions thereof.

5. The method of claim 1 or 2 wherein said first release agent is a waxy short-chain telomer of tetrafluoroethylene.

6. The method of claim 2 wherein said first and second release agents are the same.

7. The process of claim 2 wherein at least one of said first and second release agents is a dispersion of a fluorotelomer.

8. The method of claim 2 wherein at least one of said first and second release agents is in the form of particles, a particle dispersion or a powder.

9. The method of claim 2 wherein at least one of said first and second release agents is a waxy short-chain telomer of tetrafluoroethylene.

10. The method of claim 2 wherein at least one of said first and second release agents is in the form of an emulsion.

11. The method of claim 1 wherein said first release agent is a fluorinated hydrocarbon.

12. The method of claim 1 wherein said first release agent is a dispersion of a fluorotelomer.

13. The method of claim 12 wherein said fluorotelomer is tetrafluoroethylene.

14. The method of claim 12 wherein said dispersion additionally contains one or more members selected from the group consisting of dispersing solvents and solvent extenders.

15. The method of claim 12 wherein said dispersion additionally contains trichlorotrifluoroethane.

16. The method of claim 12 wherein said dispersion additionally contains a mixture of trichlorotrifluoroethane and trichloroethane.

17. The method of claim 12 wherein said dispersion additionally contains trichloroethane.

18. The method of claim 12 wherein said dispersion additionally contains methylene chloride.

19. The method of claim 12 wherein said dispersion additionally contains a mixture of trichlorotrifluoroethane, as a solvent, and toluene, as a solvent extender.

20. The method of claim 12 wherein said dispersion additionally contains a mixture of trichlorotrifluoroethane, as a solvent, and heptane as a solvent extender.

21. The method as set forth in claim 12 wherein said dispersion additionally contains a solvent extender selected from the group consisting of: heptane, perchloroethylene, trichloroethylene, toluene, benzene, naphtha, methanol, ethanol, isopropanol, acetone, dioxane, glycol, water, trichloroethane, methylene chloride, and mixtures thereof.

22. The method of claim 1 wherein said first release agent is in the form of particles, a particle dispersion, or a powder.

23. The method of claim 1 wherein the container is silo, bin, hopper car, truck body or barge.

24. The method of claim 1 wherein the said first release agent is in the form of an emulsion.

* * * * *